United States Patent
Schunk et al.

(10) Patent No.: US 7,252,865 B2
(45) Date of Patent: Aug. 7, 2007

(54) PROTECTIVE FILMS CONTAINING COMPATIBLE PLASTICIZER COMPOUNDS USEFUL IN POLARIZING PLATES FOR DISPLAYS AND THEIR METHOD OF MANUFACTURE

(75) Inventors: Timothy C. Schunk, Livonia, NY (US); Donald R. Diehl, Rochester, NY (US); Daniel T. Linehan, Rochester, NY (US); Zora T. Marlowe, Rochester, NY (US); Deepak Shukla, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 378 days.

(21) Appl. No.: 10/945,305

(22) Filed: Sep. 20, 2004

(65) Prior Publication Data

US 2006/0062933 A1   Mar. 23, 2006

(51) Int. Cl.
  *G02B 1/04* (2006.01)
  *G03C 1/31* (2006.01)

(52) U.S. Cl. ........... 428/1.3; 428/1.1; 430/634; 264/211; 264/343; 39/117; 39/122; 359/499

(58) Field of Classification Search ......... 428/1.31, 428/1.1, 1.54–1.55; 430/631, 638, 912, 634; 264/211, 343; 349/117–122; 359/499
See application file for complete search history.

(56) References Cited

U.S. PATENT DOCUMENTS

| | | | | |
|---|---|---|---|---|
| 1,600,700 A | * | 9/1926 | Schmidt et al. | 106/169.36 |
| 2,275,034 A | * | 3/1942 | Moyle | 560/127 |
| 2,794,030 A | * | 5/1957 | Phillips et al. | 549/546 |
| 3,277,032 A | * | 10/1966 | Caldwell | 524/733 |
| 3,491,038 A | * | 1/1970 | Massengale et al. | 524/36 |
| 4,440,541 A | | 4/1984 | Berke | |
| 6,468,609 B2 | * | 10/2002 | Marien et al. | 428/1.1 |
| 6,881,454 B2 | * | 4/2005 | Taguchi | 428/1.1 |
| 2002/0162483 A1 | | 11/2002 | Shimizu et al. | |
| 2002/0192397 A1 | | 12/2002 | Tsujimoto | |
| 2003/0037703 A1 | | 2/2003 | Saito | |
| 2003/0057595 A1 | * | 3/2003 | Tsujimoto | 264/217 |
| 2003/0148134 A1 | | 8/2003 | Ono et al. | |

FOREIGN PATENT DOCUMENTS

| | | |
|---|---|---|
| DE | 200 21 356 U1 | 12/2000 |
| EP | 1 160 591 A1 | 12/2001 |
| WO | 99/32427 | 12/1998 |
| WO | 03/062314 A1 | 7/2003 |

OTHER PUBLICATIONS

La Mesta, Catalogue 060201[online], [retrieved on Nov. 21, 2006]. Retrieved from the Internet:: <URL: http://download.la-mesta.com/fichiers/catalogue%20060201.pdf>.*

Kok Chemware, Acids and Bases, pKa and pKb, 2002, [online], [retrieved on Nov. 21, 2006]. Retrieved from the Internet: <URL: http://home.planet.nl/~skok/techniques/laboratory/pka_pkb.html>.*

* cited by examiner

*Primary Examiner*—Terrel Morris
*Assistant Examiner*—Sow-Fun Hon
(74) *Attorney, Agent, or Firm*—Chris P. Konkol

(57) ABSTRACT

Polymer films comprising plasticizer compounds represented by Structure 1 as described in the specification are useful as protective films in polarizing plates for display applications. Methods of manufacturing such polymer films and polarizing plates are also disclosed.

31 Claims, 1 Drawing Sheet

PROTECTIVE FILMS CONTAINING COMPATIBLE PLASTICIZER COMPOUNDS USEFUL IN POLARIZING PLATES FOR DISPLAYS AND THEIR METHOD OF MANUFACTURE

FIELD OF THE INVENTION

The present invention relates to polymer films comprising plasticizers useful in polarizing plates and display applications. In particular, the invention relates to the use of plasticizer compounds comprising ester linkages that are not directly bonded to an aryl group, and in which at least one ester linkage is directly or indirectly bonded to an alicylic ring.

BACKGROUND OF THE INVENTION

The proliferation of flat panel displays into increasing numbers of applications places higher demands on the performance of all display components. Flat panel displays based on liquid crystal switching modes and electroluminescent technology both depend on the use of polarizing plates to improve the image quality. With the increasing penetration of flat panel displays into mobile and outdoor application comes the demand for improved environmental stability of all components.

One component of displays that have long been known to have severe restrictions on environmental durability, in particular with respect to exposure to elevated temperature and humidity, are polarizing plates. Polarizing plates are multi-layer structures comprising an oriented polarizing film. Polarizing films require a protective covering to maintain stability of the polarizing film. Conventionally, protective polymer films 1 have been laminated to both faces of a polarizing film 2 as shown in FIG. 1. The most commercially successful class of polarizing films comprises oriented polyvinyl alcohol (PVA) that has been dyed to provide polarizing activity in the visible light spectrum. The protective films are required to be optically transparent, dimensionally stable, mechanically tough, and chemically compatible with polarizing films. The most commercially successful of these protective films has been cellulose triacetate (commonly known in the polarizer industry as triacetyl cellulose or TAC), although other polymers may be used.

For the purposes of this invention the following terms are defined:

A "polarizing film" is defined herein as a self-bearing oriented polymer film with associated addenda that performs the function of polarizing light. For example, oriented PVA film that has been dyed by complexation with dichroic organic compounds or iodine and cross-linked with borate, including ancillary addenda, is an effective polarizer film. Henceforth herein it is understood that the term "dye" includes dichroic organic compounds and iodine, except as otherwise specified.

A "protective film" is defined herein as a self-bearing polymer film with associated addenda, such as plasticizers, UV absorbers, stabilizers, etc., that is laminated, adhered to, coated, or otherwise applied onto the polarizing film to provide protection for the polarizing film. Protective functions can include providing stability in terms of mechanical, optical, chemical, or other properties and resistance to environmental degradation. The durability of polarizing plates is conventionally measured based on retention of their polarization efficiency and light-transmission performance when exposed to elevated temperature and/or humidity environments for extended time periods.

A "protective film" can comprise part of a composite film including, for example, a carrier layer. A "polarizing plate" is defined herein as the multilayer polymer film structure consisting of at least one polarizing film and at least one protective film. The invention is particularly advantageous when the protective film is the first self-bearing film contiguous to the polarizing film in a polarizing plate.

Previous approaches have been described which attempt to improve the environmental durability of polarizing plates. For the most part these efforts have focused on controlling the moisture content and moisture permeability of the protective films in the polarizing plate (See, for example, US 20020192397A1, US 20020162483A1, and US 20030037703A1). These approaches have attempted to control the moisture permeation properties through the use of high levels of organic compounds known to plasticize the protective film. For the purposes of this invention a plasticizing compound or "plasticizer" is defined as a compound that is chemically compatible with the polymer and reduces brittleness or imparts improved flexibility and elongation to the film.

In support of the present invention, intensive study was undertaken to determine the key factors compromising the durability of polarizer plates under environmental stress, i.e., elevated temperature and/or humidity. This study has shown that acceptable moisture permeation of the protective film, as defined for example in US patent application 20020192397A1, allows polarizer plates to rapidly achieve moisture uptake equilibrium. The key factor contributing to long-term failure of polarization efficiency and light transmission performance of polarizer plates was determined to depend on the release of active chemical species, particularly those that are mobile. In particular, these species were found to be related to the breakdown products of plasticizer and other protective film components. These findings are supported by prior work as found, for example, in: Shinigawa et al. "Investigation of the Archival Stability of Cellulose Triacetate Film: The Effect of Additives to CTA Support," *Polym. Conserv.*, 105 (1992), 138-150; and Ram et al. "The Effects and Prevention of the 'Vinegar Syndrome'," *J. Imaging Sci. and Tech.*, 38 (1994), 749-761, all hereby incorporated by reference.

Prior attempts to improve the durability of polarizer plates have been described. US patent application 20020192397A1 discloses the use of elevated levels of phosphate ester plasticizers to control the moisture permeability of the protective film. However, as noted by Ram et al. and Shinigawa et al., phosphate ester plasticizers release strongly acidic compounds upon exposure to elevated humidity. In addition, chemically active hydroxy arenes, such as phenols, are released.

The use of a small-molecule basic compound (tributyl amine) is also disclosed in US 20020192397A1 to reduce the odor of acetic acid in TAC protective films. Small-molecule basic compounds are not preferred, however, as they readily migrate into the polarizer film and are reactive toward the polarizer dye components.

The use of ester compounds that can release chemically active hydroxy arenes, such as phenol, is also not preferred. The current study has shown that undesirable reaction with iodine in the polarizer film to produce iodophenols occurs in polarizer plates that have been subjected to elevated temperature and humidity when hydroxy arene ester plasticizers are employed. The reactivity of hydroxy arenes toward halogens is well known, as described by Morrison, R. T. and Boyd, R. N., *Organic Chemistry*, 3$^{rd}$ Ed., Allyn and Bacon, Boston, 1976, pp. 801-802, hereby incorporated by reference.

US 20020162483A1 and U.S. Pat. No. 5,753,140 disclose the use of elevated levels of aromatic ester plasticizers to control moisture permeability and moisture content in protective films for polarizer plates. Such compounds release strongly acidic compounds and/or chemically active hydroxy arenes upon exposure to elevated humidity. US patent application 20030037703A1 discloses the use of elevated levels of monocarboxylic acid esters of polyhydric alcohols as plasticizers to control moisture permeability of protective films for polarizer plates. Due to the use of esters of monocarboxylic acids, again elevated humidity conditions lead to the production of mobile acidic compounds.

In the cases described above (US 20020192397A1, US 20020162483A1, and US 20030037703A1), the acidic species and hydroxy arenes produced have the potential to readily migrate through the polarizer plate structure. Strongly acidic species can participate in the degradation of the protective films, the adhesion interface to the polarizing film, and most critically, the organic dyes in the polarizing film. Interaction of the dyes in the PVA polarizing film with such reactive species can produces significant hue shift contributing to degradation of the polarizer plate performance.

In addition, in the cases described above (US 20020192397A1, US 20020162483A1, US 20030037703A1) high levels of these compounds (>15% by weight) are incorporated into the polymer lamination films in order to provide significant control of moisture permeability and moisture content. These high levels are undesirable as they lead to unacceptable loss of toughness by the protective film through reductions in polymer modulus (*Handbook of Plasticizers*, G. Wypych, ed., ChemTec Publishing, NY, 2004, Chap. 10).

SUMMARY OF THE INVENTION

The present invention is directed to a self-bearing protective film containing at least one compound selected from a class of compounds having non-aryl ester linkage which compounds are represented by the following Structure I:

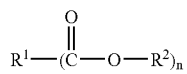
(I)

wherein:
$R^1$ and $R^2$ are both non-aryl groups; n is 2 or more; and at least one of $R^1$ and $R^2$ comprise at least one cycloalkyl group. The "n" multiple $R^2$ groups may be the same or different from one another.

A non-aryl group, in the above Structure I, is defined as a group that does not provide a direct bond between the —C(=O)O— linkage in Structure I (hereafter the "ester link") to an aromatic moiety. One or more aromatic or aryl groups may optionally be present elsewhere in the chemical structure of $R^1$ and $R^2$ as long as such a group is not directly bonded to the ester link shown in Structure I, preferably all ester links present in the compound.

In one embodiment of the invention, the $R^1$ and $R^2$ non-aryl groups, respectively, are residues of an alcohol and carboxylic acid that react to form the ester link, such that the ester link is not directly bonded to an aryl moiety.

In one embodiment of the invention, the self-bearing film is used as a protective film for a polarizing film in a polarizing plate, wherein the polarizing film comprises dye-doped polyvinyl alcohol useful in display applications. The use of the present plasticizer compounds advantageously provides an unexpectedly significant increase in environmental durability of the polarizing film.

In another embodiment of the invention, the incorporation of oligomeric and polymeric low-mobility basic compounds in the protective film, in addition to the plasticizer compounds, provides a further significant increase in environmental durability.

Sill another embodiment of the invention is directed to a method of making the protective film of the present.

DETAILED DESCRIPTION OF THE INVENTION

Figure 1:
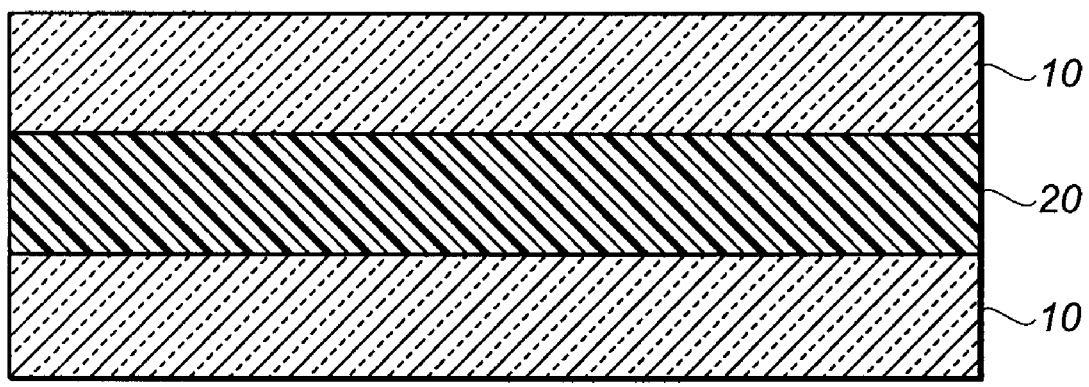
FIG. 1 is a cross-sectional view of a polarizing plate that shows the configuration of layers consisting of protective films on either side of a polarizing film.

The present invention can be attained by a polymer film comprising an ester compound of a non-aromatic polycarboxylic acid and one or more monohydric alcohols. Functions of the non-aromatic ester compounds to provide materials of increased environmental durability are further clarified herein.

As indicated above, the polymeric protective film that provides increased environmental durability is comprised of a composition containing at least one compound of a class of ester compounds represented by the following Structure I:

(I)

wherein:
$R^1$ and $R^2$ are both non-aryl groups;
n is an integer of 2 or more; and
$R^1$ and/or $R^2$ comprise (in whole or part) at least one cycloalkyl group.

As evident by Structure I, the —(C=O)O— ester link is linked to $R^1$ by the carbonyl carbon of the carboxyl group and to $R^2$ by the oxy group attached to the carboxy group. Preferably, there are no aryl groups directly bonded to any ester linkage in the compound of Structure I.

In a preferred embodiment, the non-aryl groups $R^1$ and $R^2$ substituted or unsubstituted organic groups independently selected from the group consisting of alkyl, alkenyl, alkynyl, cycloalkyl, and cycloalkenyl, so long as at least one or more groups in $R^1$ and/or $R^2$ groups comprise a cycloalkyl group (in whole or part). One or more aromatic functional groups may optionally be present as part of the chemical structure of $R^1$ or $R^2$ but, as mentioned above, the one or more aromatic functional groups may not be directly bonded to the carbonyl carbon or oxy atom (attached to the carboxyl group) in the ester link —(C=O)O—. Heteroatoms such a oxygen, nitrogen, and sulfur may be present as part of the chemical structure of $R^1$ or $R^2$, but the heteroatoms are preferably not directly bonded to the carbonyl carbon or oxy atom.

Examples of the $R^1$ and $R^2$ organic groups include such alkyl groups as ethyl, propyl, butyl, etc.; alkenyl groups such as ethylenyl, propylenyl, etc.; alkynyl groups such as propynyl, etc.; cycloalkyl groups such as cyclopropyl, cyclobutyl, cyclopentyl, cyclohexyl, methylcyclohexyl, etc.; alkyl cycloalkyl, alkylene cycloalkyl, etc.; and heterocyclic groups, which organic groups may be substituted. The organic group described above may be substituted to contain heteroatoms as a portion of the group (for example: oxygen to imply alkyl ethers, tetrahydrofurans, etc.; sulfur to imply alkyl thioethers, or nitrogen to imply saturated heterocycles such as piperidinyl etc.). The heteroatom is preferably not directly bonded to the carboxylic acid. The organic group described above may contain additional substituent groups (for example, a phenyl group, a hydroxyl group, an alkyl group, a halogen group, etc.) Aromatic rings that may form a substituent on the organic groups of the non-aryl ester can include, for example, a phenyl ring, a naphthalene ring, or an anthracene ring.

In a particularly preferred embodiment, $R^1$ and/or $R^2$ comprise a cyclohexyl or cyclopentyl group.

In general, when reference in this application is made to a particular moiety or group it is to be understood that such reference encompasses that moiety whether unsubstituted or substituted with one or more substituents (up to the maximum possible number). For example, "alkyl" or "alkyl group" refers to substituted or unsubstituted alkyl, while "phenyl group" refers to a substituted or unsubstituted phenyl (with up to six substituents). Generally, unless otherwise specifically stated, substituent groups usable on molecules herein include any groups, whether substituted or unsubstituted, which do not destroy properties necessary for plasticizing utility. Examples of substituents on any of the mentioned groups can include known substituents, such as: chloro, fluoro, bromo, iodo; hydroxy; alkoxy, particularly those "lower alkyl" (that is, with 1 to 12 carbon atoms, for example, methoxy, ethoxy; substituted or unsubstituted alkyl, particularly lower alkyl (for example, methyl, trifluoromethyl); thioalkyl (for example, methylthio or ethylthio), particularly either of those with 1 to 12 carbon atoms; substituted or unsubstituted alkenyl, preferably of 2 to 12 carbon atoms (for example, ethenyl, propenyl, or butenyl); substituted and unsubstituted aryl (within the limits of Structure I), particularly those having from 6 to 20 carbon atoms (for example, phenyl); and substituted or unsubstituted heterocyclic and (within the limits of Structure I) heteroaryl, particularly those having a 5 or 6-membered ring containing 1 to 3 heteroatoms selected from N, O, or S (for example, pyridyl, thienyl, furyl, pyrrolyl); and other groups known in the art. Further, with regard to any alkyl group or alkylene group, it will be understood that these can be branched or unbranched and include ring structures. As indicated above, the preparation of the non-aryl ester compounds involve the reaction product on alcohol and a carboxylic acid. In one embodiment of the invention, the $R^1$ and $R^2$ non-aryl groups, respectively, in the above Structure I, are residues, respectively, of an alcohol and carboxylic acid that react to form the ester link, such that the ester link is not directly bonded to an aryl moiety.

In one preferred embodiment, the carboxylic acid is a non-aryl polycarboxylic acid (a compound having a plurality of, namely two or more, carboxylic acid groups on an organic moiety) that is represented by the following Structure II:

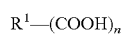  (II)

wherein:

$R^1$ is the same non-aryl group as described above, and n is an integer of not less than 2, preferably 2.

Again, one or more aromatic functional groups may be present as part of the chemical structure of $R^1$, but the one or more aromatic functional groups may not be directly bonded to the carbonyl carbon. In one embodiment, the polycarboxylic acids have pKa greater than 3, preferably greater than 3.5. Most preferred are polycarboxylic acids having pKa greater than 4.

Examples of polycarboxylic acids include, but are not limited to, the following: malonic acid, methylmalonic acid, butylmalonic acid, dimethylmalonic acid, succinic acid, methylsuccinic acid, dimethylsuccinic acid, 2-ethyl-2-methylsuccinic acid, glutaric acid, 2,4-dimethylglutaric acid, adipic acid, methyladipic acid, tetramethylhexanedioic acid, pimelic acid, suberic acid, 1,10-decanedicarboxylic acid, sebacic acid, hexadecanedioic acid, tricarballylic acid, methyltricarballylic acid, 1,2,3,4-butanetetracarboxylic acid, fumaric acid, citraconic acid, beta-hydromuconic acid, hexafluoroglutaric acid, tartaric acid, citric acid, diglycolic acid, tetrahydrofuran-2,3,4,5-tetracarboxylic acid, 3,3'-thiodipropionic acid, 4-ketopimelic acid, 1,1-cyclopropanedicarboxylic acid, 1,2-cyclobutanedicarboxylic acid, 1,2-cyclopentanedicarboxylic acid, 3,3-tetramethyleneglutaric acid, camphoric acid, 1,1-cyclohexanediacetic acid, 1,2-cyclohexanedicarboxylic acid, 1,3-cyclohexanedicarboxylic acid, 1,4-cyclohexanedicarboxylic acid, 1,3-adamantanedicarboxylic acid, 5-norbornene-2,3-dicarboxylic acid, 1,3,5-cyclohexanetricarboxylic acid, 1,2,3,5-cyclohexanetetracarboxylic acid, 1,2,4,5-cyclohexanetetracarboxylic acid, 1,2,3,4-cyclobutanetetracarboxylic acid, 1,2,3,4,5,6-cyclohexanehexacarboxylic acid.

The alcohols, preferably monohydric, that may be used for the preparation of the non-aryl ester in the present invention are limited by the requirement that the hydroxyl functional group is not attached to an aromatic group. Monohydric alcohols that may be used include aliphatic and cyclic alcohols. The aliphatic and cyclic alcohols may contain additional substituent groups (for example, a phenyl group, an alkyl group, a halogen group, etc.).

Preferred examples of the alcohols include aliphatic straight chain or branched chain organic groups having a carbon atom number of preferably 1 to 32, more preferably from 1 to 20, and most preferably 1 to 16. Cyclic monohydric alcohols include monocyclic, bicyclic, or tricyclic ring structures having a carbon atom number of preferably 3 to 20, more preferably 4 to 14, and most preferably 5 to 8. Such monohydric alcohols may also contain heteroatoms as a portion of the chain or ring (for example: oxygen to imply alkyl ethers, tetrahydrofurans, etc.; sulfur to imply alkyl thioethers, or nitrogen to imply monohydroxy substituted heterocycles such as N-methylpiperidinol, etc.). The heteroatom preferably is not be directly bonded to the hydroxyl group.

Examples of monohydric alcohols that may be used include, but are not limited to, the following: methyl alcohol, ethyl alcohol, propanol, butanol, pentanol, hexyl alcohol, heptanol, octanol, dodecanol, 2-propanol, 2-octanol, 3-methyl-2-butanol, 2-methyl-2-propanol, 4-penten-1-ol, cyclopropanemethanol, cylclobutanol, cyclobutanemethanol, cyclopentanol, 3-cyclopentyl-1-propanol, cyclohexanol, methylcyclohexanol, cyclohexylmethanol, cyclohexylethanol, 4-ethylcyclohexanol, cycloheptanol, cyclooctanol, norborneol, decahydronaphthol, cyclohexenol, 6-chloro-1-hexanol, heptafluorobutanol, 2-(2-ethoxyethoxy)ethanol, 2-(cyclohexyloxy)ethanol, glycidol, hydroxytetrahydrofuran, tetrahydropyran-2-methanol, tetrahydropyran-4-ol, 2-methylthioethanol, 2-hydroxyethylpyrrolidine, 4-hydroxy-1-methylpiperidine.

The molecular weight of the non-aryl ester compounds used in the invention is not specifically limited, but is preferably from 250 to 1500, and more preferably from 300 to 750. The non-aryl ester compounds of relatively higher molecular weight may be preferable with respect to the property of lower sublimation during polymer casting, whereas the non-aryl ester compounds of relatively lower molecular weight may be preferable with respect to the property of improved miscibility with film polymers including cellulose acetate.

The alcohols for the preparation of the non-aryl polycarboxylic esters used in the present invention may be used singly or in a mixture of two or more kinds thereof. It is especially preferred that all the carboxylic acid groups of the non-aryl polycarboxylic acid be esterified such that no free carboxylic acid functional groups remain when added to the polymer phase for the protective film.

As indicated above, the non-aryl ester compounds used in the invention contain a cycloalkyl ring in the molecule. Such cycloalkyl ring may be a functional group of either one or both of the non-aryl polycarboxylic acid or the monohydric alcohol that can be used in preparing the compounds. An especially preferred non-aryl ester would contain at least one cyclohexyl ring.

Examples of non-aromatic polycarboxylate esters in the invention are exemplified by the compounds described in DE20021356U1 page 3; line 25 through page 41; line 12 the disclosures of which are incorporated by reference herein. In addition, examples of the non-aromatic polycarboxylate esters in the invention are exemplified below but are not limited thereto.

1

2

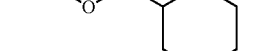

3

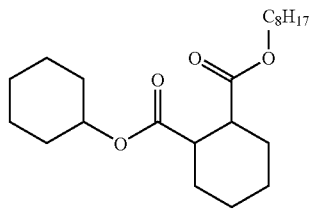

4

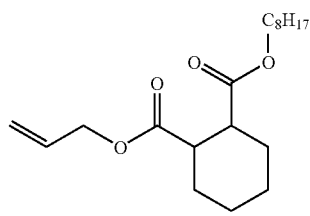

5

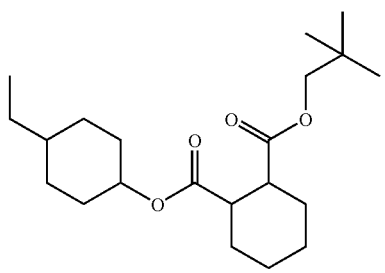

6

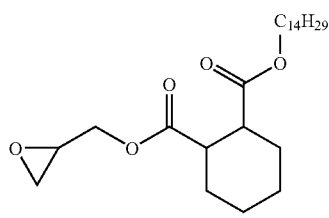

7

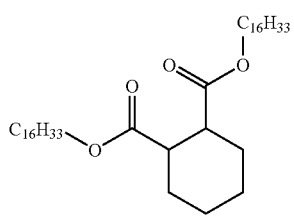

8

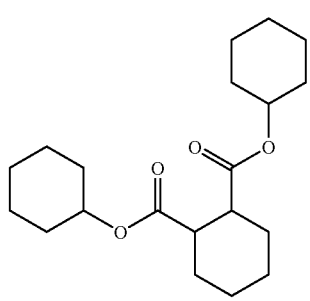

9

-continued

-continued
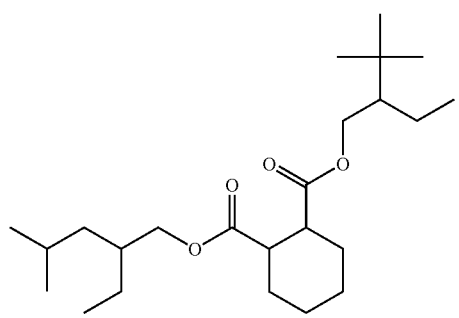
20
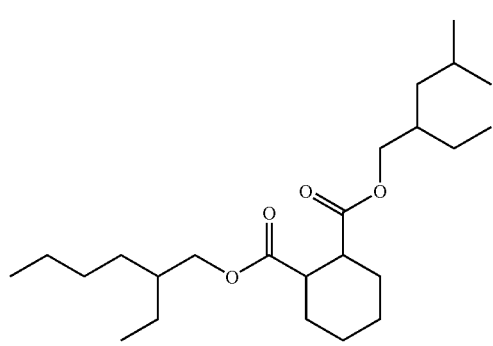
21
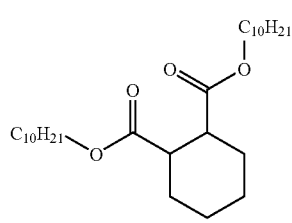
22
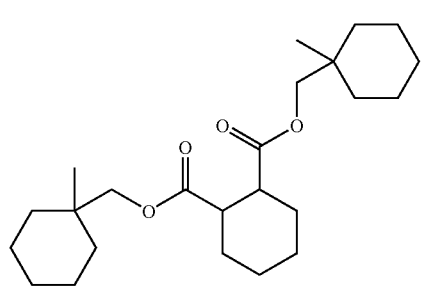
23
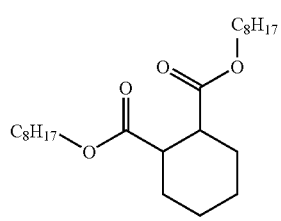
24
-continued
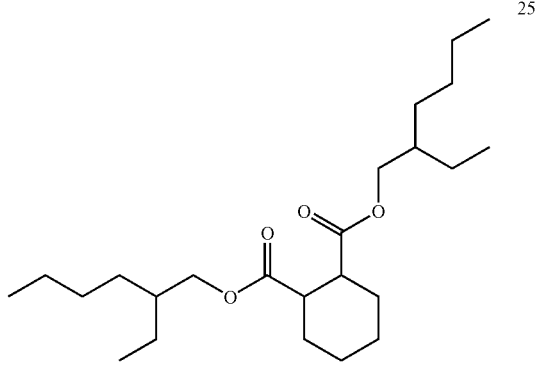
25
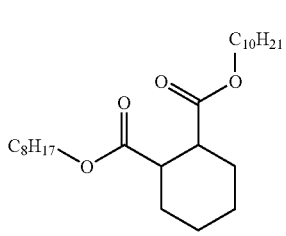
26
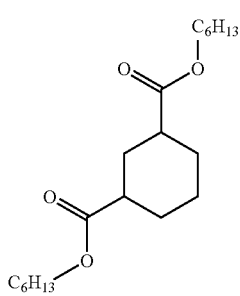
27
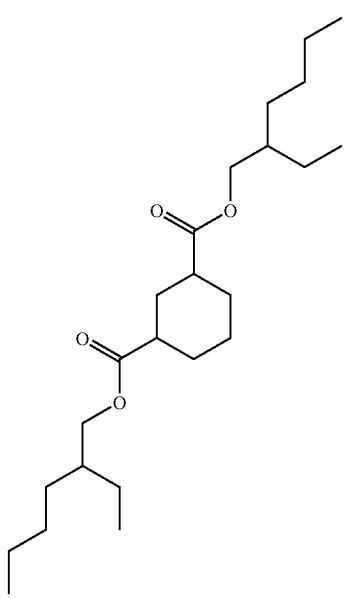
28

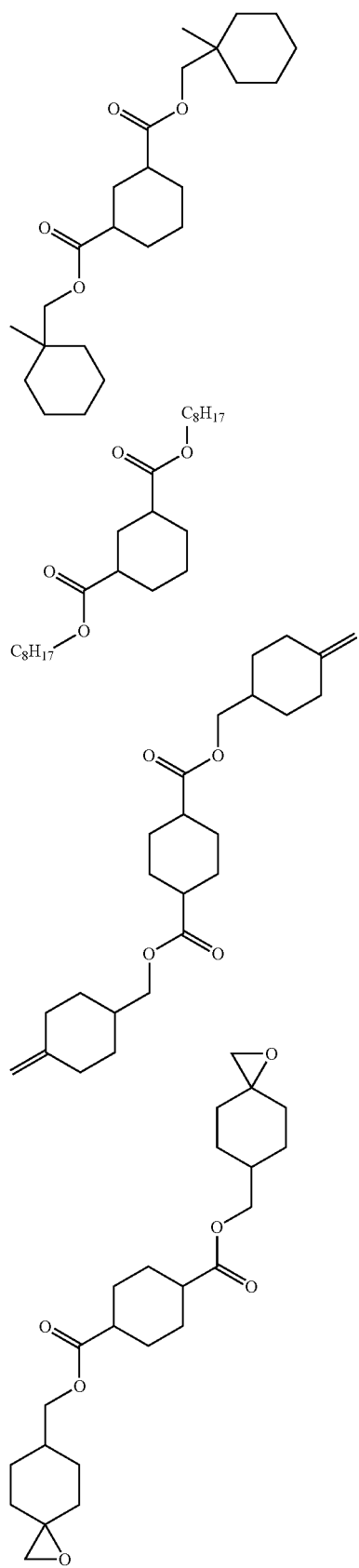
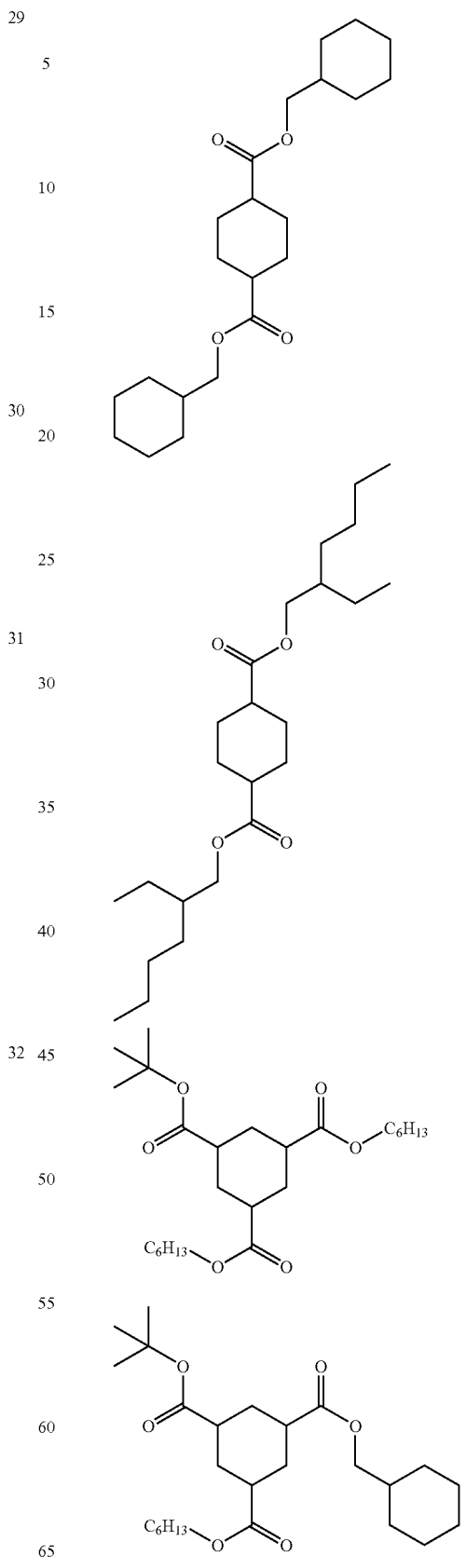

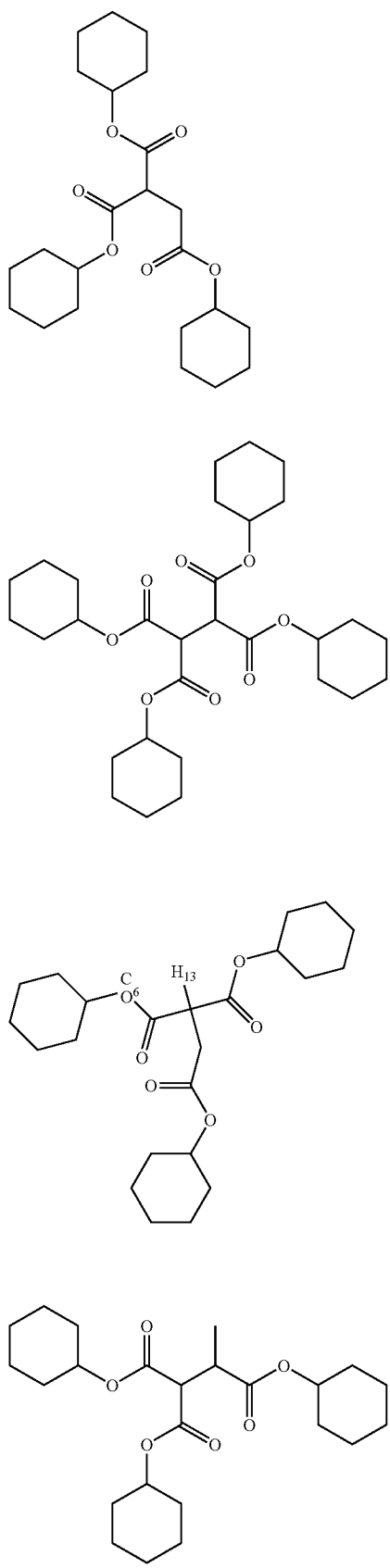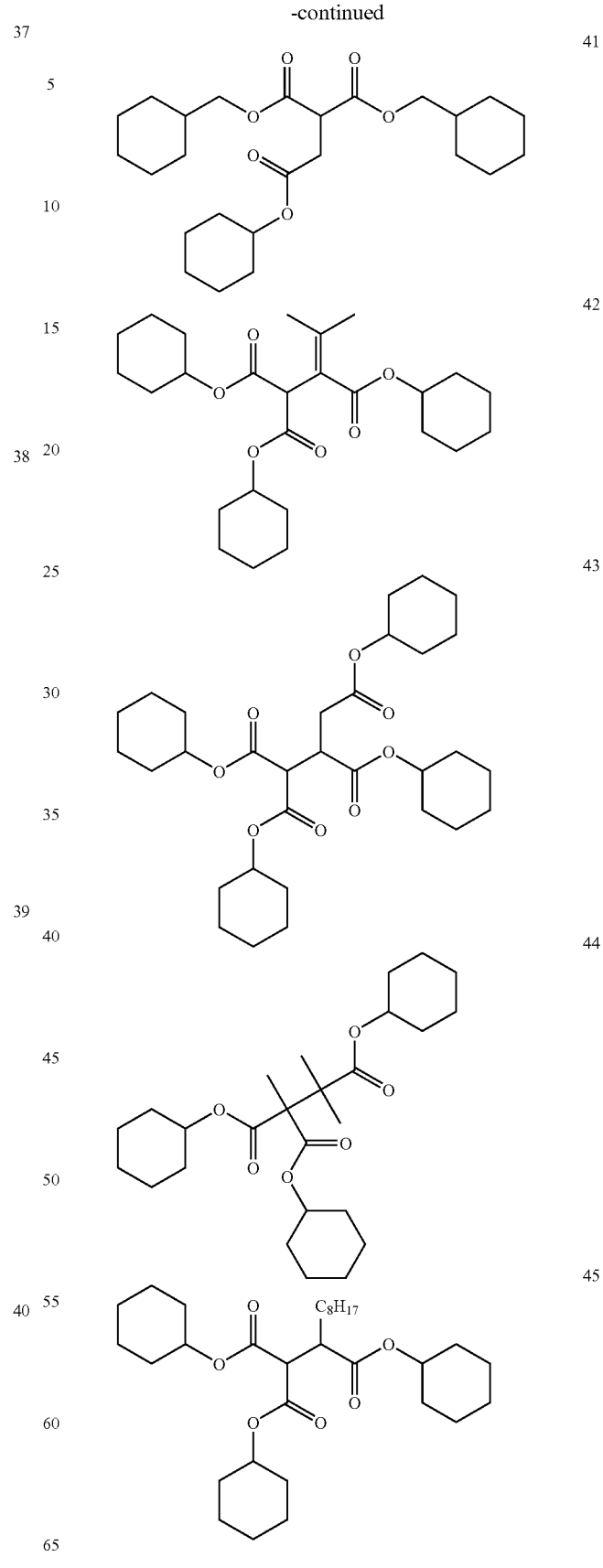

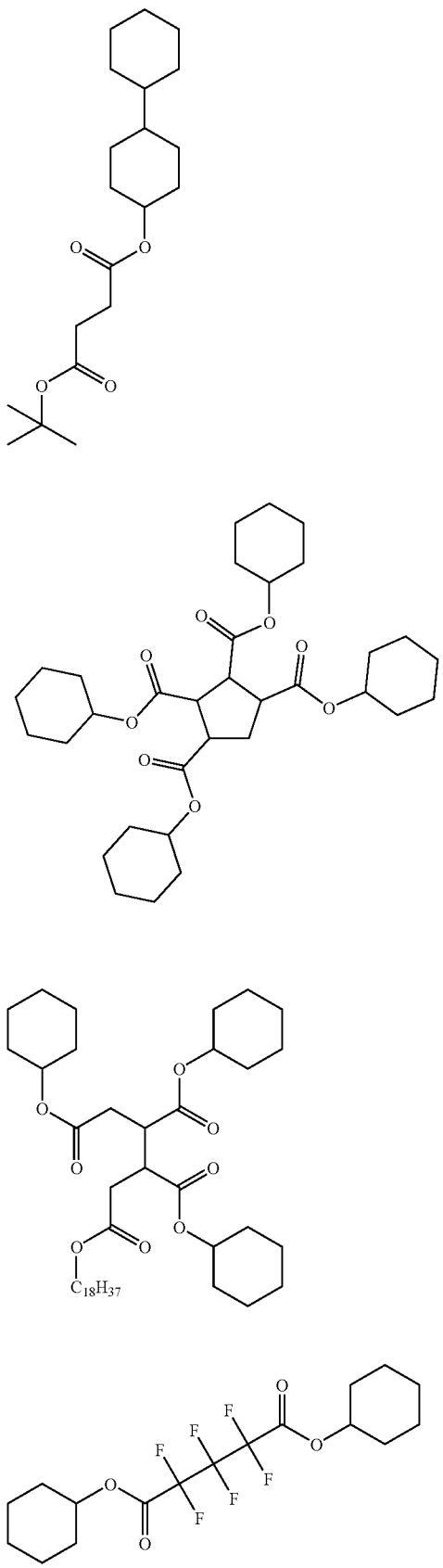

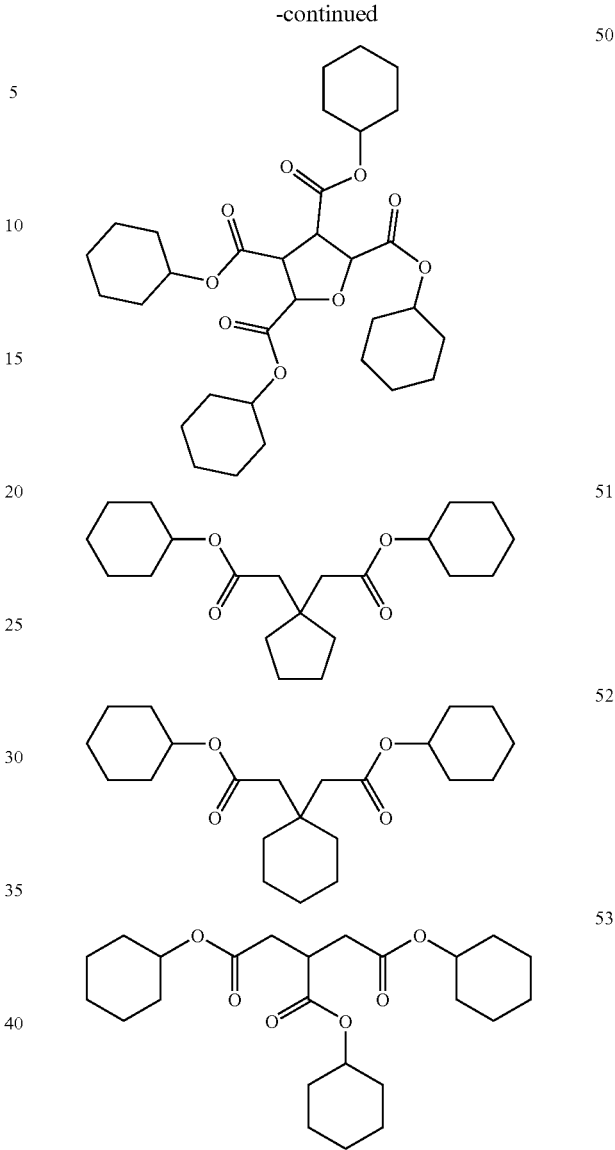

The plasticizer is preferably contained in the film in an amount of 0.01% to 30 weight %, preferably in the amount of 5% to 15 weight %, most preferably in the amount of 10% to 15%.

The protective film generally may contain one or more additional plasticizers other than those of the present invention, preferably in lesser amounts by weight. Examples of such other plasticizers include phosphate esters such as triphenyl phosphate, biphenylyl diphenyl phosphate, tricresyl phosphate, cresyl diphenyl phosphate, octyl diphenyl phosphate, trioctyl phosphate, and tributyl phosphate; and phthalate esters such as diethyl phthalate, dimethoxyethyl phthalate, dimethyl phthalate, and dioctyl phthalate; glycolic acid esters such as triacetin, tributyrin, butyl phthalyl butyl glycolate, ethyl phthalyl ethyl glycolate, and methyl phthalyl ethyl glycolate.

Another embodiment of the invention comprises the incorporation of oligomeric and polymeric low-mobility basic compounds in the protective film, in addition to the plasticizer compounds, to provide a further significant increase in environmental durability. Low mobility is herein defined as being exemplified by polymer film components with limited tendency those migrate due to compatibility and diffusivity. Such compounds are believed to function to scavenge any acids that form in the film. Examples of oligomer and polymeric low-mobility basic compounds are exemplified below, but are not limited thereto:

Poly(4-vinylpyridine) and poly(2-vinylpyridine)

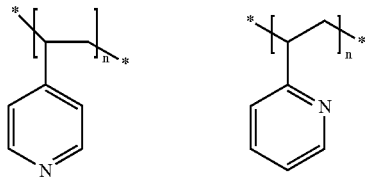

Poly(acrylonitrile-co-butadiene), amine terminated

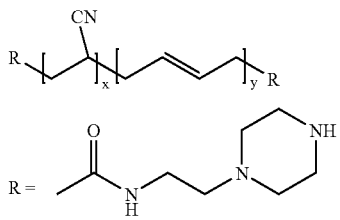

Poly [N,N'-bis(2,2,6,6-tetramethyl-4-piperidinyl)-1,6-hexanediamine-co-2,4-dichloro-6-morpholino-1,3,5-triazine]

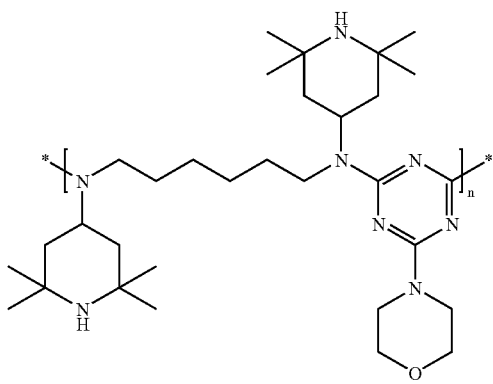

Poly(1,2-dihydro-2,2,4-trimethylquinoline)

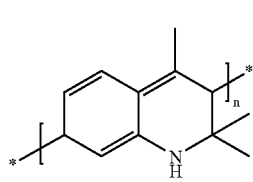

Polyethyleneimine, high molecular weight

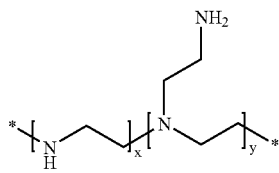

Polyethyleneimine, epichlorohydrin modified

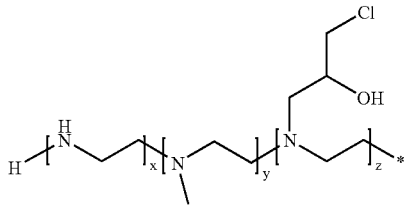

Polyethylenimine, 80% ethoxylated

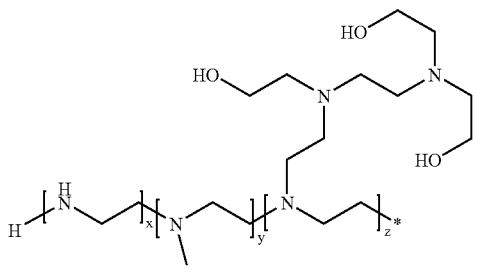

Poly(9-vinylcarbazole)

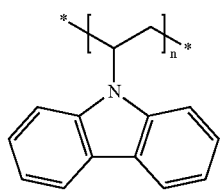

Poly(vinyl chloride-co-1-methyl-4-vinylpiperiazine)

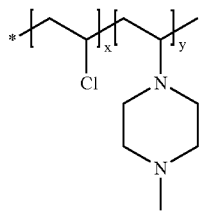

Poly(4-vinylpyridine-co-butyl methacrylate)

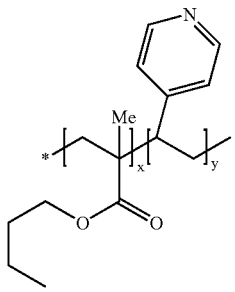

The low-mobility basic compound is preferably contained in the film in an amount of less than 5 weight %, preferably in the amount of 0.01% to 2 weight %, most preferably in the amount of 0.1% to 1%.

Protective films preferably also contain an ultraviolet absorber to provide a sharp UV cut-off (wavelength value) in the transmittance curve. In accordance with specific embodiments of the invention, ultraviolet light absorbing compounds preferably comprise a dibenzoylmethane, hydroxyphenyl-s-triazine, hydroxyphenylbenzotriazole, formamidine, benzophenone, or benzoxazinone compound and derivatives thereof. Additional possible UV absorbers which may be employed include salicylate compounds, such as 4-t-butylphenylsalicylate; and [2,2'-thiobis-(4-t-octylphenolate)]-n-butylamine nickel(II). Such ultraviolet light absorbing compounds are themselves known, and have been described for use in various polymer films. Preferred are derivatives of dibenzoylmethane, hydroxyphenyl-s-triazine and hydroxyphenylbenzotriazole compounds. Combinations of UV absorber technologies may be employed as disclosed in copending commonly assigned US patent application publication US 20030080326A1, hereby incorporated by reference herein.

The protective film used in the present invention may optionally contain particles of an inorganic or organic compound to provide surface lubrication. Examples of the inorganic compound include silicon dioxide, titanium dioxide, aluminum oxide, zirconium oxide, calcium carbonate, talc, clay, calcined kaolin, calcined calcium silicate, hydrate calcium silicate, aluminum silicate, magnesium silicate, and calcium phosphate. Preferred are silicon dioxide, titanium dioxide, and zirconium oxide, and especially silicon dioxide. Examples of the organic compound (polymer) include silicone resin, fluororesin and acrylic resin. Preferred is acrylic resin as disclosed in copending commonly assigned US patent application publication US 20030180528A1, hereby incorporated by reference herein.

Examples of preferred polymers employable for use as the polymeric phase in the protective film of the present invention include polyesters (e.g., polyethylene terephthalate and polyethylene-2,6-naphthalate); cellulose esters (e.g., cellulose diacetate, cellulose triacetate, cellulose acetate propionate, and cellulose acetate butyrate); polyolefins (e.g., polypropylene and polyethylene); acrylic resins (e.g., polymethyl methacrylate); polycarbonate esters (e.g., polycarbonate); norbornene resins, and the like.

In one preferred embodiment, the protective film of the invention is in the form of a self-bearing polymer film wherein the polymer is a cellulose ester such as a cellulose acetate, particularly cellulose triacetate. As the cellulose triacetate, known materials can be employed. The combined acetic acid acetyl value of cellulose triacetate preferably is in the range of 35% to 70% weight, especially in the range of 55% to 65% weight. The weight average molecular weight of cellulose acetate preferably is in the range of 70,000 to 200,000, especially 80,000 to 190,000. The polydispersity index (weight average divided by number average molecular weight) of cellulose acetate is in the range of 2 to 7, especially 2.5 to 4. Cellulose acetate may be obtained from cellulose starting materials derived from either wood pulp or cotton linters. Cellulose acetate may be esterified using a fatty acid such as propionic acid or butyric acid so long as the acetyl value satisfies the desired range.

The protective film may have a thickness ranging from 5 to 200 microns, preferably 15 to 100 microns, more preferably about 20 to 80 microns.

In a preferred embodiment, the protective films exhibit an in-plane retardation ranging from 0.1 to 15 nm, an out-of-plane retardation ranging from −10 to −100 nm, and total haze less than 1 percent. Such protective films may additionally exhibit an equilibrium moisture content at 25 C and 50% RH of less than 5% by weight.

Protective films according to the present invention may be prepared by a variety of methods. In one preferred embodiment, such films are prepared by utilizing a solvent coating or casting method. Details of the solvent coating method are described in copending commonly assigned US patent application publication 2003/0215582A1, the teachings of which are hereby incorporated herein by reference. The solvent casting method may comprise the steps of: casting the polymer solution fed from a slit of a solution feeding device (die) onto a support and drying the cast layer to form a film. In a large-scale production, the method can be conducted, for example, by the steps of casting a polymer solution (e.g., a dope of cellulose triacetate) onto a continuously moving band conveyor (e.g., endless belt) or a continuously rotating drum, and then vaporizing the solvent of the cast layer. In a small-scale production, the method can be conducted for example, by the steps of casting a polymer solution fed from a slit of a solution feeding device on a fixed support having a regular size such as a metal plate or glass plate by moving the device, and then vaporizing the solvent of the cast layer.

Any support can be employed in the solvent casting method, so long as the support has the property that a film formed thereon can be peeled therefrom. Supports other than metal and glass plates (e.g., plastic film) are employable, so long as the supports have the above property. Any die can be employed, so long as it can feed a solution at a uniform rate. Further, as methods for feeding the solution to the die, a method using a pump to feed the solution at a uniform rate can be employed. In a small-scale production, a die capable of holding the solution in an appropriate amount can be utilized.

The polymer employed in the solvent casting method is required to be capable of dissolving in a solvent. Further a film formed of the polymer is generally required to have high transparency for application in optical products. Furthermore, the polymer preferably has compatibility with the plasticizers. As the polymer employed in the solvent coating or casting method, preferred is cellulose triacetate. However, other polymers including, but not limited to, polyesters, cellulose esters, polyolefins, acrylic resins, polycarbonate esters, or norbornene resins can be employed so long as they satisfy the above conditions.

As another possible method for the formation of protective film, other than the solvent casting method, there can be mentioned the well known extrusion molding method comprising the steps of mixing the polymer and the addenda in a melt, and extruding the mixture. The method is usually applied to polymers that cannot utilize the solvent casting method.

In another aspect of the present invention, the self-bearing film is used as a protective film for a polarizing film in a polarizing plate, typically wherein the polarizing film comprises dye-doped polyvinyl alcohol useful in display applications. Any polarizing film can be used, however, including conventional films well known in the art. As mentioned above, one type of polarizing film is produced by stretching a film of polyvinyl alcohol (PVA) and then causing iodine to be adsorbed as a polarizing element on the resulting oriented film. Those polarizers making use of iodine as a polarizing element have good optical performance, displaying high photopic transmission and high polarization efficiency. Another type of polarizing film, considered more durable under conditions of high temperature and humidity, uses dichroic organic dyes as a replacement for iodine in the polarizers. Many examples of dichroic organic dyes for polarizing films may be found in the patent literature, for example: U.S. Pat. No. 5,310,509, U.S. Pat. No. 5,340,504, U.S. Pat. No. 5,446,135, JP 2002296417, JP 2000329936, JP 05273788, JP 63243166, EP 549342, U.S. Pat. No. 5,667,719, and the journal literature such as *Proceedings of the SPIE-Int. Soc. Opt. Eng.* Vol. 2407, pp. 62-72, "Highly Durable Dyed Polarizer for Use in LCD Projections," all of these hereby incorporated by reference with respect to the described polarizing film.

Polarizing films that make use of dichroic organic dye as a polarizing element, although tending to have better durability against water and heat compared with polarizing films using iodine, tend to show increased sensitivity to hue change in the presence of acidic species. It is common practice to use water-soluble azo dyes for the manufacture of polarizing films. Combinations of two or more dyes make it possible to produce polarizing films dyed in various hues. It is common to use multiple dyes with a high degree of dichroism to provide a neutral hue to the polarizing film.

Examples of dichroic dyes (Colour Index Generic Name) include, but are not limited thereto, the following:

C.I. Direct Yellow 12, C.I. Direct Blue 202, C.I. Direct Red 31, C.I. Direct Yellow 44, C.I. Direct Yellow 28, C.I. Direct Orange 107, C.I. Direct Red 79, C.I. Direct Blue 71, C.I. Direct Blue 78, C.I. Direct Red 2, C.I. Direct Red 81, C.I. Direct Violet 51, C.I. Direct Orange 26, C.I. Direct Red 247, C.I. Direct Blue 168, C.I. Direct Green 85, C.I. Direct Brown 223, C.I. Direct Brown 106, C.I. Direct Yellow 142, C.I. Direct Blue 1, and:

C.I. Direct Violet 9

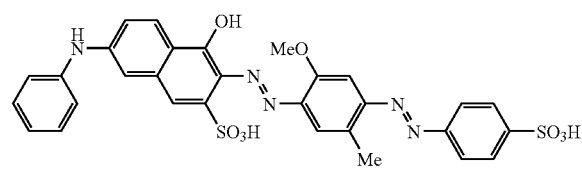

C.I. Direct Red 81

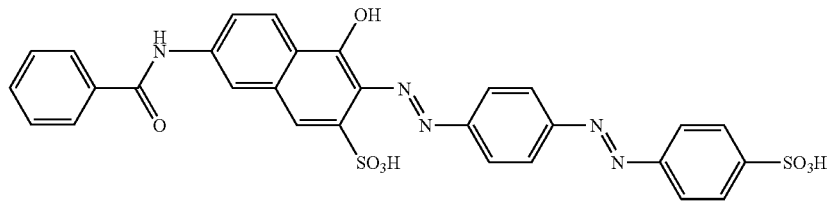

Chemical Abstracts Registry Number 6300-50-1

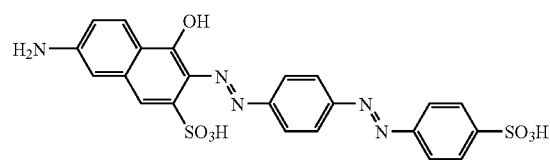

Chemical Abstracts Registry Number 134476-95-2

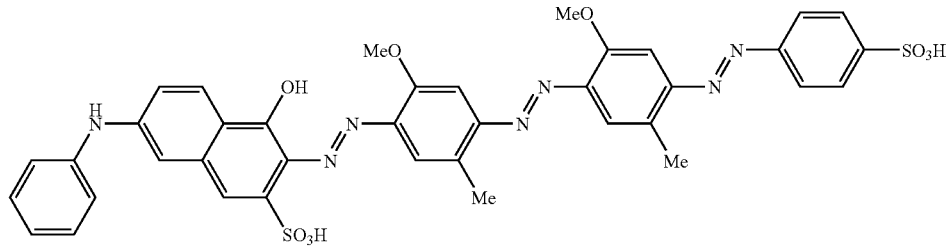

Chemical Abstracts Registry Number 121227-50-7

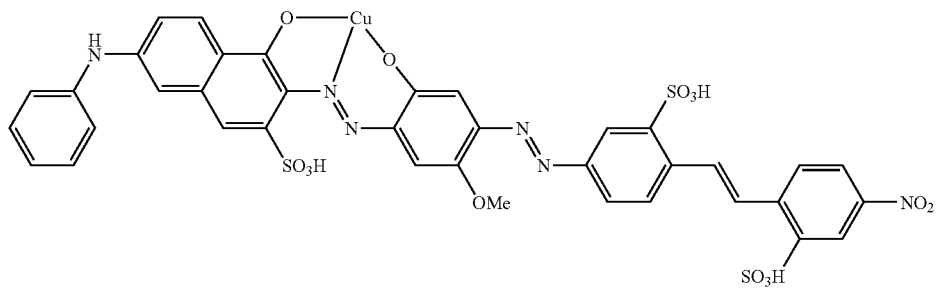

C.I. Direct Blue 98

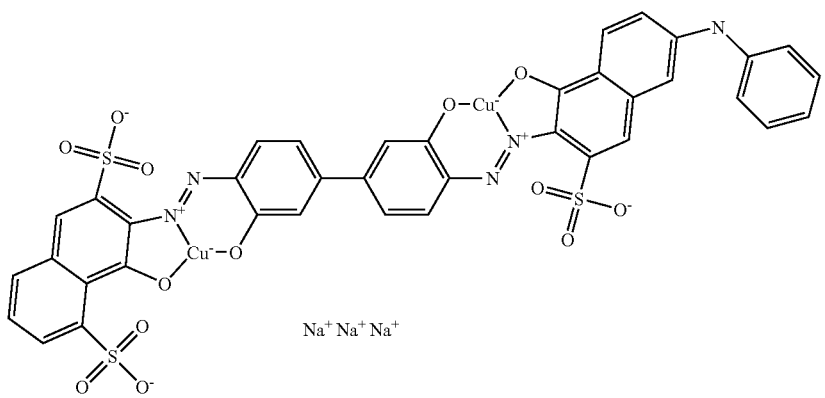

A process for the preparation of the protective film in the form of an optical polymer film in accordance with one preferred embodiment of the invention will now be explained in detail, in this case employing cellulose triacetate as the polymer phase for the film. In a mixing vessel, a solvent, cellulose triacetate and one or more plasticizers according to the present invention are placed, and cellulose triacetate is dissolved by stirring (under heating, if desired under pressure) to prepare a dope.

In another or second mixing vessel, a solvent and selection of ultraviolet (UV)absorbers, chemical stabilizers, and additional plasticizers are placed, and are dissolved by stirring. In the case that particles to improve surface lubrication are added, the particles may be placed in the resultant UV absorber containing solution and the mixture is dispersed using a dispersing machine to prepare a dispersion. An appropriate amount of the UV absorber containing solution is fed to the vessel holding the dope, and they are mixed. The mixture (dope) is fed to a casting head appropriately through a filter for the dope, and is cast from the casting head on a drum or continuous belt of metal (support). The cast film is dried during one rotation of the support to form a film having self-bearing properties, and the dried film is separated from the support, and then the film is sufficiently dried to be wound on a roll. In another embodiment the film may be dried in its entirety and wound on the casting support as described in copending commonly assigned US patent application publication 2003/0215582A1, the teachings of which are incorporated herein by reference.

The dope and the absorber containing solution can be mixed by the use of a static mixer which is mounted in the piping before the casting head, fed to the casting head and cast from the casting head on a metal drum (support). Any solvent can be employed in the solvent casting method so long as the polymer used (e.g., cellulose triacetate) can be dissolved. The solvent may be single solvent or a combination of solvents. Examples of solvents employed in the solvent casting method include aliphatic hydrocarbons such as pentane, hexane, heptane, octane, isooctane and cyclohexane; aromatic hydrocarbons such as benzene, toluene and xylene; chlorinated hydrocarbons such as chloromethane, dichloromethane, carbon tetrachloride and trichloroethane; alcohols such as methanol, ethanol, isopropyl alcohol and n-butyl alcohol; ketones such as acetone, methyl ethyl ketone, and cyclohexanone, and esters such as methyl formate, ethyl formate, methyl acetate and ethyl acetate, or dioxalane.

In the case of employing cellulose triacetate as the polymer, a mixed solvent of dichloromethane and methanol is preferred. Other solvents such as isopropyl alcohol and n-butyl alcohol can be employed so long as cellulose triacetate is not deposited (e.g., during the procedure of preparing the dope or adding particles to the dope). A ratio of cellulose triacetate and solvent in the dope is preferably 10:90 to 30:70 by weight (cellulose triacetate:solvent).

In the procedure of preparing the dope or the dispersion, various additives such as a dispersing agent, a fluorescent dye, an antifoamant, a lubricant, an antioxidant, a radical scavenger, an acid scavenger, an inhibitor of fade, and a preservative can be added to the dope or the dispersion. In addition, enhanced durability of the protective lamination film to the action of light, heat, moisture, and oxygen in terms of UV light blockage, visible spectrum color, and dimensional stability may be imparted by the addition of chemical stabilizers from the list of hindered amine light stabilizers, hindered phenols, acid scavengers, and UV stabilizers. Combinations of stabilizer technologies may be employed as disclosed in commonly assigned US patent U.S. Pat. No. 6,767,937B2 and incorporated by reference herein.

Various functional layers such as a hard-coat layer, an anti-glare layer, a low reflection layer, an anti-reflection layer, an anti-stain layer, an anti-static layer, a conductive layer, an optically anisotropic layer, a liquid crystalline layer, an orientation layer, an adhesion layer, and a subbing layer can be provided on the polymer film of the invention. These functional layers can be provided by conventionally known methods of coating, evaporation, sputtering, plasma discharge, or flame discharge. A polarizer plate comprising said functional layers then comprises an integral multilayer film structure comprising the inventive polymer film claimed herein.

In a preferred embodiment, the protective film is employed in the production of polarizing plates, which polarizing plate comprises a polarizing film and, on one side or both sides of the polarizing film, the protective film.

The polarizing film can be prepared on commercial scale processing equipment designed for the production of display grade polarizers, for example as described in U.S. Pat. No. 5,310,509A, hereby incorporated herein by reference. In Example 1, polyvinyl alcohol (PVA) film is dyed with a mixture of organic dichroic dyes and uniaxially stretched. Alternatively, as described in US 20020162483A1, hereby incorporated herein by reference, particularly Section 0224, polyvinyl alcohol (PVA) film can be swollen in water, uniaxially stretched, and dyed with aqueous iodide. The polarizing film is then further immersed in an aqueous solution of boric acid, washed with water, and dried.

The polarizing plate, according to one particular embodiment, can be prepared as follows. The protective film, optionally combined, in a multilayer structure or composite film, with a carrier or other functional films, can be laminated to polarizing film using a variety of adhesives suitable for producing an optically uniform laminated structure. For example, cellulose triacetate film can be surface hydrolyzed by immersion in aqueous base (such as 2 N NaOH) at elevated temperature (e.g., 60° C.), then washed with water, neutralized in aqueous mineral acid (such as 10% wt HCl), again washed with water, and dried. Adhesion of surface hydrolyzed cellulose triacetate can be promoted by the use of aqueous PVA solution added to the nip of a lamination process when sheets of surface hydrolyzed cellulose triacetate are brought together on one or both sides of a PVA polarizing film. The resulting laminated polarizing plate is then dried to remove excess internal moisture.

In the case where the protective film is combined in a multilayer structure or composite film, with a carrier or other functional films, the protective film is preferably the self-bearing layer closest to the polarizing film. However, in such cases, a tie-layer or bonding layer of less than 5 microns may be present between the polarizing film and the protective film.

The following examples are meant to be illustrative, but are not intended to be limiting in the choice of materials within the scope of the invention as should be obvious to those skilled in the art.

EXAMPLES

Preparation of cyclohexane-1,2-dicarboxylic acid dihexyl ester

A mixture of 1,2-cyclohexanedicarboxylic anhydride (60 g), hexanol (85 g), and p-toluenesulfonic acid (100 mg) in toluene (500 mL) was refluxed for 3 days and water removed from the reaction mixture. After reaction was complete, solvent was removed in vacuo to yield a viscous oil. The crude material was redissolved in heptane and passed through a pad of silica gel to obtain cyclohexane-1,2-dicarboxylic acid dihexyl ester (80 g) as a pale yellow oil.

Preparation of 1,2,3-propanetricarboxylic acid tricyclohexyl ester

A mixture of 1,2,3-propanetricarboxylic acid (25 g), cyclohexanol (55 g), and p-toluenesulfonic acid (100 mg) in toluene (500 mL) was refluxed for 2 days and water removed from the reaction mixture. After reaction was complete, solvent was removed in vacuuo to yield a viscous oil. The crude material was redissolved in heptane and passed through a pad of silica gel to obtain 1,2,3-propanetricarboxylic acid tricyclohexyl ester (50 g) as a pale yellow oil.

Preparation of cyclohexane-1,2-dicarboxylic acid, monoethyl ester, monohexadecyl ester A mixture of 1,2-cyclohexanedicarboxylic acid monohexadecyl ester (white solid m.p.=54-55° C.) (8 g) (prepared from 1,2-cyclohexanedicarboxylic anhydride (1 eq), hexadecanol (1 eq), triethylamine (1 eq), in ethyl acetate at room temperature for 24 hours) in 50 ml of tetrahydrofuran was treated with oxalyl choloride (5 g) overnight at room temperature. After solvent removal in vacuuo the resultant acid chloride was dissolved in 50 ml of absolute ethanol, and sodium carbonate (2.2 g) was added. The mixture was stirred for 3 hours, filtered and concentrated in vacuuo. The light yellow liquid product was dissolved in hexane and passed through a pad of silica gel. Solvent removal gave cyclohexane-1,2-dicarboxylic acid monoethyl ester monohexadecyl ester (5.3 g) as a clear colorless liquid which forms a waxy solid when cooled to below room temperature.

Testing of Acidic Hydrolysis Products:

A comparison of the reactivity of acidic hydrolysis products of ester plasticizers toward dichroic organic dyes was evaluated for a series of compounds. Acid compounds were selected as representative of potential hydrolysis products of compounds described in the current invention, as well as those disclosed in US 20020192397A1, US 20020162483A1, and US 20030037703A1, each incorporated by reference. This experiment simulates how, under environmental exposure to elevated temperature and humidity, plasticizers used in the protective films for polarizer plates have the potential to degrade resulting in the release of reactive species.

For each acid compound a 5 millimolar solution was prepared using a mixture of 1:1 DMSO:water solution containing 0.04 mg/mL of a representative dichroic dye compound described above (CAS Number 121227-50-7). Periodic time aliquots of the solutions were evaluated by HPLC as described below to determine the loss of the dichroic dye compound as the solution was held at 100° C. for 24 hrs. HPLC analysis was performed on a YMC-AQ-302 column at 2.0 mL/min, 0.1 M sodium acetate (1:1 methanol:acetonitrile) mobile phase using 50 μL injections of the experimental solutions with analyte detection at 640 nm. Table 1 below summarizes the resulting observed loss of CAS Number 121227-50-7 dichroic dye upon exposure to acidic compounds.

TABLE 1

| No. | Acid Hydrolysis Product | Percent loss of Dye |
|---|---|---|
| 1 | diphenyl phosphate | −83% |
| 2 | phthalic acid | −38% |
| 3 | benzoic acid | −18% |
| 4 | 1,2-cyclohexane dicarboxylic acid | −10% |
| 5 | tricarballylic acid | −10% |

Acid hydrolysis product 4 is a potential degradation product associated with Plasticizer Compounds 1-26 (above) usable in the present invention. Acid hydrolysis product 5 is associated with Plasticizer Compound 53. Acid hydrolysis products 1 to 3 are associated with plasticizer compounds other than the plasticizer compounds required by the present invention.

The results shown in Table 1 above clearly indicate that acidic compounds corresponding to compounds described for use in the present invention show minimal loss of dichroic dye. Conversely, acidic compounds released by hydrolysis of various other ester plasticizer compounds produce significant loss in dichroic dye.

Evaluation of Protective Lamination Films:

Example 1A:

In a mixing vessel for a polymer dope, 100 weight parts of cellulose triacetate (TAC) (combined acetic acid value: 60.8%), 11.24 weight parts of a plasticizer compound 1, 0.107 weight parts of Parsol® 1789 (4-(1,1-dimethylethyl)-4'-methoxydibenzoylmethane), 0.91 weight parts Tinuvin® 328 (2-(2'-hydroxy-3',5'-di-tert-amylphenyl)benzotriazole), 0.16 weight parts Tinuvin® 326 (2-(2'-hydroxy-3'-tert-butyl-5'-methylphenyl)-5-chlorobenzotriazole), 405 weight parts of dichloromethane, and 45.0 weight parts of methanol were placed, and all components were dissolved by stirring under heating to prepare a dope.

The mixed dope was fed to an extrusion die and cast on a moving metal support. After the cast film was separated from the casting surface, the film was dried by passing through a heating zone to prepare a cellulose acetate film having a thickness of 80 μm providing a polymer film suitable for the protective lamination film component of a polarizing plate.

Examples 1B and 1C

All parts of preparing the dope and protective lamination film were as described in Example 1A with the exception that for Ex. 1B, 5.62 weight parts of a plasticizer compound 1 was used and for Ex. 1C, 16.86 weight parts of a plasticizer compound 1 was used.

Example 2A, 2B and 2C

A polymer dope was prepared as in Example 1A with the exception that different weight parts of a plasticizer compound 53 were used in place of the compound 1 as follows; Ex. 2B, 5.62; Ex. 2A, 11.24; and Ex 2C, 16.86 weight parts of compound 53. All other parts of preparing the dope and the protective lamination film were as described in Example 1A.

Example 3

A polymer dope was prepared as in Example 1A with the exception that 11.24 weight parts of a plasticizer compound 53 was used in place of the compound 1 and 0.56 weight parts of poly(4-vinyl pyridine) was added to the dope. All other parts of preparing the dope and the protective lamination film were as described in Example 1A.

Comparative Example 1A, 1B, and 1C

A polymer dope was prepared as in Example 1A with the exception that different weight parts of triphenyl phosphate were used in place of the compound 1 as follows: Comp. Ex. 1B, 5.62; Comp. Ex. 1A, 11.24; and Comp. Ex. 1C, 16.86 weight parts of triphenyl phosphate. All other parts of preparing the dope and the protective lamination film were as described in Example 1A.

Comparative Example 2

A polymer dope was prepared as in Example 1A with the exception that 11.24 weight parts of triphenyl phosphate was used in place of the compound 1 and 0.56 weight parts of poly(4-vinyl pyridine) was added to the dope. All other parts of preparing the dope and the protective lamination film were as described in Example 1A.

Comparative Example 2

A polymer dope was prepared as in Example 1A with the exception that a plasticizer compound was not used. All other parts of preparing the dope and the protective lamination film were as described in Example 1A.

Protective Lamination Film Performance:

For the example protective lamination films, the compatibility of the plasticizer with the polarizer plate lamination was evaluated. In particular, the tendency of plasticizers to migrate to the protective lamination film surface strongly affects the adhesion quality to the polarizing film. Plasticizer surface excess concentration was evaluated by ATR-FTIR using a BioRad® FTS 60 FTIR Spectrophotometer with a Specac Golden Gate® ATR Accessory. Table 2 below shows the observed trends in surface excess plasticizer (or deficit as indicated by a negative number) in the top 1.2 microns of the film. Reduced surface excess is indicative of improved compatibility of the plasticizer with the polymer film.

TABLE 2

| | | Ex. A 5% Wt plasticizer in film | Ex. B 10% Wt plasticizer in film | Ex. C 15% Wt plasticizer in film |
|---|---|---|---|---|
| Example set 1 | Compound 1 | 0.3% surface excess | −3.5% surface excess | −0.9% surface excess |
| Example set 2 | Compound 53 | −0.3% surface excess | −3.8% surface excess | −5.3% surface excess |
| Comparative Example set 1 | triphenyl phosphate | 1.6% surface excess | 4.2% surface excess | 7.1% surface excess |

The results shown in Table 2 clearly indicate that a significant improvement in plasticizer compatibility with the protective film is provided through the incorporation of the non-aryl ester compounds used in the present invention as compared with the commonly used triphenyl phosphate.

Protective Film Performance (Contact Angle):

As described above, each example protective film was prepared for lamination to the polarizing film by alkaline surface hydrolysis. The quality and uniformity of the subsequent adhesion between the surface hydrolyzed protective film and the polarizing film is determined by the surface energy of the films. Water contact angle is employed as a direct indication of surface energy. Accordingly, a higher water contact angle is indicative of a lower surface energy that can tend to be relatively adverse for adhesion quality.

To promote effective adhesion to the PVA polarizing film, a water contact angle of less than 35° is desirable. In addition, to promote uniform adhesion, a uniform surface energy (uniform water contact angle) is obviously desirable. Table 3 below shows the advancing water contact angle of alkaline hydrolyzed example films measured after 120 seconds for each example protective lamination film both freshly after hydrolysis and 11 days after hydrolysis stored at 25° C., 50% RH.

TABLE 3

| | | Freshly hydrolyzed film | | 11 days after film surface hydrolysis | |
|---|---|---|---|---|---|
| | Plasticizer | Mean | Std Dev | Mean | Std Dev |
| Example 1A | Compound 1 | 20.2° | 3.3° | 28.3° | 6.1° |
| Example 2A | Compound 53 | 24.7° | 1.1° | 28.0° | 6.8° |
| Comparative Example 1A | triphenyl phosphate | 16.7° | 1.4° | 44.7° | 12.0° |

The results shown in Table 3 clearly indicate that the incorporation of the non-aryl ester compounds used in the present invention provide low, stable and uniform surface energy of the protective film after surface hydrolysis. On the contrary, the commonly used triphenyl phosphate shows both significant non-uniformity and a dramatic increase in surface energy to a level that would compromise adhesion with time after surface hydrolysis. These results are consistent with the enhanced compatibility of the inventive non-aryl ester compounds as protective film plasticizers. These results are consistent with the relatively lower tendency of the plasticizer compounds used in the present invention to surface segregate as demonstrated in Table 2 above.

Polarizer Plate Durability:

Each example polarizer plate was evaluated for environmental durability by storage at 80° C., 90% relative humidity. The polarizer plates were evaluated periodically for retention of their polarization efficiency and light transmission performance for up to 1400 hours. Determination of the CIE human perception photopic transmission (Y value) was made using the D65 illumination (1964 observer) standard. Polarization efficiency was calculated as shown in the following Equation 1:

$$PE = 100[(Y_{\parallel} - Y_{\perp})/(Y_{\parallel} + Y_{\perp})]^{1/2} \quad \text{(Eq. 1)}$$

Dichroic-dye PVA polarizing films were prepared having been dyed with a mixture of Direct Orange 39, Direct Red 81, Direct Violet 9, and Direct Blue 98 to obtain a neutral hue. Each example protective lamination film after alkaline hydrolysis was used to prepare polarizer plates by lamination to both sides of the polarizing film using an aqueous:methanol:PVA glue in the lamination nip. For environmental durability testing, polarizer plates were dried and adhered to Corning® Type 1737-G glass using an optical grade pressure sensitive adhesive. Table 4 below shows the change in dichroic organic dye polarizer plate Polarization Efficiency, PE, and Photopic Transmission, Y, after exposure to 80° C., 90% RH conditions.

TABLE 4

| Sample | Plasticizer | Low mobility basic compound | Time till 5% Loss in PE (hr) | Time till |5%| Change in Y (hr) |
|---|---|---|---|---|
| Example 1A | Compound 1 | None | >1400 | >1400 |
| Example 2A | Compound 53 | None | 1200 | 1400 |
| Example 3 | Compound 53 | poly(4-vinyl pyridine) | >1400 | >1400 |
| Comp. Ex. 1A | triphenyl phosphate | None | 440 | 630 |
| Comp. Ex. 2 | triphenyl phosphate | poly(4-vinyl pyridine) | 800 | 770 |

The results shown in Table 4 above clearly indicate that a significant improvement in dichroic-dye polarizer plate durability is provided through the incorporation of the inventive non-aromatic ester compounds in the protective lamination films applied to the polarizer plate. In contrast, commonly used triphenyl phosphate is associated with rapid failure of the polarizer plate performance. Significant improvement is demonstrated by the addition of an oligomeric or polymeric low mobility basic compound.

Iodine-dyed polarizing films were prepared having been dyed with an aqueous KI and $I_2$ solution after uniaxial stretching. Each example protective lamination film after alkaline hydrolysis was used to prepare polarizer plates by lamination to both sides of the polarizing film using an aqueous:methanol:PVA glue in the lamination nip. For environmental durability testing, polarizer plates were dried and adhered to Corning® Type 1737-G glass using an optical grade pressure sensitive adhesive. Table 5 below shows the change in iodine dyed polarizer plate Polarization Efficiency, PE, and Photopic Transmission, Y, after exposure to 80° C., 90% RH conditions, relative to best performance.

TABLE 5

| Sample | Plasticizer | Time till 5% Loss in PE (hr) | Time till 5% Change in Y (hr) |
|---|---|---|---|
| Example 1A | Compound 1 | >1000 | >1000 |
| Example 2A | Compound 53 | 570 | 640 |
| Comp. Ex. 1A | triphenyl phosphate | 520 | 510 (hazy) |
| Comp. Ex. 3 | None | 200 | 500 |

The results shown in the above Table 5 clearly indicate that a significant improvement in iodine dyed polarizer plate durability is provided through the incorporation of the inventive non-aromatic ester compounds in the protective lamination films applied to the polarizer plate. In contrast, protective films with either no plasticizer or the commonly used triphenyl phosphate are associated with more rapid failure of the polarizer plate performance.

Parts List 10 protective polymer films
20 polarizing film

What is claimed is:
1. A self-bearing polymer film comprising a polymer selected from cellulose esters, polycarbonate esters, and norbornene resins, which polymer film comprises, in a polymer phase, at least one plasticizer compound represented by the following structure:

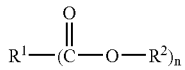

wherein:
$R^1$ and $R^2$ are both non-aryl groups at the bond to the —C(=O)O— ester link;
n is an integer of 2 or more, wherein each $R^2$ may be the same or different; and
at least one cycloalkyl group is present in either or both of $R^1$ and $R^2$, wherein the cycloalkyl group is a cyclohexyl or cyclopentyl group;
wherein the self-bearing polymer film has mechanical, optical, and chemical properties for use as a protective layer disposed on one or both sides of a polarizing film to form a polarizing plate, the self-bearing polymer film having a thickness ranging from 5 to 200 microns, exhibiting an in-plane retardation ranging from 0.1 to 15 nm, an out-of-plane retardation ranging from −10 to −100 nm, and wherein the plasticizer compound is present in the range of about 1 to 30 weight percent.

2. The self-bearing film of claim 1 wherein $R^2$ and $R^1$ are, respectively, the residues resulting from the reaction product of an alcohol and carboxylic acid.

3. The self-bearing film of claim 1 wherein the non-aryl groups $R^1$ and $R^2$ may be selected from alkyl, alkenyl, alkynyl, cycloalkyl, and cycloalkenyl, which groups may be substituted or unsubstituted and heteroatoms may be present as part of the chemical structure of $R^1$ or $R^2$, but any heteroatoms are not directly bonded to the carbonyl carbon or oxy of the ester link.

4. The self-bearing film of claim 1 there are no aromatic groups present as part of $R^1$ and $R^2$, unless the aromatic group is not directly bonded to the carbonyl carbon or oxy of the ester link.

5. The self-bearing film of claim 1 wherein optional substituents on $R^1$ and $R^2$ are independently selected from a phenyl group, an alkyl group, an alkoxy, a hydroxy, a halogen group, an alkyl ether group, an alkyl thioether group, or a heterocyclic group.

6. The self-bearing film of claim 1 wherein $R^1$ is a cyclohexyl, cyclopentyl, alkyl cyclohexyl, or alkyl cyclopentyl group.

7. The self-bearing film of claim 6 where at least two $R^2$ groups are independently a cycloalkyl group or alkyl cycloalkyl.

8. The self-bearing film of claim 1 wherein at least one $R^2$ is a cycloalkyl group or alkyl cycloalkyl, and $R^1$ is not a cycloalkyl.

9. The self-bearing film of claim 1 wherein at least one $R^2$ group and the $R^1$ group are independently a cycloalkyl group or an alkyl cycloalkyl group.

10. The self-bearing film as in claim 1 wherein the plasticizer compound is derived from a cycloalkyl polycarboxylic acid containing two or more carboxylate residues each forming an ester linkage to a residue of a monohydric alcohol.

11. The self-bearing film of claim 10 wherein the cycloalkyl polycarboxylic acid is a cyclohexyl polycarboxylic acid containing two or more carboxylate residues each forming an ester linkage to a residue of a monohydric alcohol.

12. The self-bearing film of claim 10 wherein each monohydric alcohol is a linear chain, branched or cyclic alkyl monohydric alcohols containing 3 to 16 carbon atoms.

13. The polymer film as in claim 12 wherein at least one monohydric alcohol is a linear chain, branched or cyclic alkyl monohydric alcohols containing six carbon atoms.

14. The self-bearing film of claim 1 wherein the plasticizer compound is a reaction product of a polycarboxylic acid having pKa greater than 3.

15. The self-bearing film of claim 1 wherein the polymer phase comprise a polymer selected from polyesters, cellulose esters, polyolefins, acrylic resins, polycarbonate esters, or norbornene resins.

16. The self-bearing film of claim 15 wherein the polymer is selected from polyethylene terephthalate, polyethylene-2,6-naphthalate, cellulose diacetate, cellulose triacetate, cellulose acetate propionate, cellulose acetate butyrate, polypropylene, polyethylene, polymethyl methacrylate, bisphenol-A-polycarbonate, bisphenol-A-trimethylcyclohexane-polycarbonate, bisphenol-A-phthalate-polycarbonate, and norbornene resins.

17. The self-bearing film of claim 1 wherein the polymer is selected from cellulose diacetate, cellulose triacetate, cellulose acetate propionate, cellulose acetate butyrate, bisphenol-A-polycarbonate, bisphenol-A-trimethylcyclohexane-polycarbonate, bisphenol-A-phthalate-polycarbonate, and norbornene resins.

18. The self-bearing film of claim 1 wherein the polymer is a cellulose ester.

19. The self-bearing film of claim 18 wherein the polymer is cellulose acetate.

20. The self-bearing film of claim 1 wherein the plasticizer compound is present in the range of about 5 to 15 weight percent.

21. The self-bearing film of claim 1 further comprising a plasticizer compound selected from phosphate esters, phthalate esters, or glycolic acid esters.

22. The self-bearing polymer film as in claim 1 further comprising an oligomeric or polymeric low-mobility basic compound.

23. The self-bearing polymer film of claim 22 wherein the low-mobility basic compound is selected from: poly(4-vinylpyridine), poly(2-vinylpyridine), poly(acrylonitrile-co-butadiene)(amine terminated), poly [N,N'-bis(2,2,6,6-tetramethyl-4-piperidinyl)-1,6-hexanediamine-co-2,4-dichloro-6-morpholino-1,3,5-triazine], poly(1,2-dihydro-2,2,4-trimethylquinoline), polyethyleneimine, polyethyleneimine (epichlorohydrin modified), polyethylenimine (80% ethoxylated), poly(9-vinylcarbazole), poly(vinyl chloride-co-1-methyl-4-vinylpiperiazine), and poly(4-vinylpyridine-co-butyl methacrylate).

24. A polarizer plate comprising an integral multilayer film structure that comprises a layer of a light polarizing material and at least one self-bearing film according to claim 1, wherein there are no aryl groups bonded directly to either side of all ester linkages in said plasticizer compound.

25. The polarizer plate of claim 24 wherein the layer of light polarizing material is located between two of said self-bearing films.

26. The polarizer plate of claim 24 wherein the light polarizing material comprises one or more dichroic organic dyes.

27. The polarizer plate of claim 24 wherein the light polarizing material comprises iodine.

28. A display device comprising a polarizer plate comprising at least one self-bearing film of claim 1 and a layer of a light polarizing material in an integral multilayer film structure.

29. The display device of claim 28 wherein the display device is a liquid crystal display or an electroluminescent display device.

30. A self-bearing polymer film comprising a polymer selected from cellulose esters, polycarbonate esters, and norbornene resins, and at least one plasticizer compound represented by the following structure:

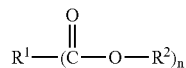

wherein:
- $R^1$ and $R^2$ are both non-aryl groups at the bond to the —C(=O)O— ester link;
- n is an integer of 2 or more, wherein each $R^2$ may be the same or different; and
- one or more cycloalkyl groups are present in either or both $R^1$ and $R^2$, wherein the cycloalkyl group is a cyclohexyl or cyclopentyl group;
- wherein the self-bearing polymer film has mechanical, optical, and chemical properties for use as a protective layer disposed on one or both sides of a polarizing film to form a polarizing plate, the self-bearing polymer film having a thickness ranging from 5 to 200 microns, exhibiting an in-plane retardation ranging from 0.1 to 15 nm, an out-of-plane retardation ranging from −10 to −100 nm, and wherein the plasticizer compound is Present in the range of about 1 to 30 weight percent;

the self-bearing polymer film further comprising a functional layer selected from the group consisting of an anti-glare layer, a low reflection layer, an anti-reflection layer, an optically anisotropic layer, and a liquid crystalline layer.

31. A composite film comprising a carrier substrate and a self-bearing polymer film, comprising a polymer selected from cellulose esters, polycarbonate esters, and norbornene resins, which polymer film comprises, in a polymer phase, at least one plasticizer compound represented by the following structure:

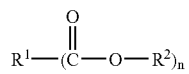

wherein:
- $R^1$ and $R^2$ are both non-aryl groups at the bond to the —C(=O)O— ester link;
- n is an integer of 2 or more, wherein each $R^2$ may be the same or different; and
- either or both the $R^1$ and $R^2$ comprise at least one cycloalkyl group wherein the cycloalkyl group is a cyclohexyl or cyclopentyl group,
- wherein the self-bearing polymer film has mechanical, optical, and chemical properties for use as a protective layer disposed on one or both sides of a polarizing film to form a polarizing plate, the self-bearing polymer film having a thickness ranging from 5 to 200 microns, exhibiting an in-plane retardation ranging from 0.1 to 15 nm, an out-of-plane retardation ranging from −10 to −100 nm, and wherein the plasticizer compound is present in the range of about 1 to 30 weight percent.

* * * * *